(12) United States Patent
Hitters et al.

(10) Patent No.: US 7,276,471 B2
(45) Date of Patent: Oct. 2, 2007

(54) AZEOTROPE-LIKE COMPOSITIONS OF PENTAFLUOROPROPANE, METHANOL AND DICHLOROETHYLENE

(75) Inventors: Guillermo J. Hitters, Hamburg, NJ (US); Gary Knopeck, Lakeview, NY (US); Ian R. Shankland, Randolph, NJ (US); Rajiv R. Singh, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 130 days.

(21) Appl. No.: 10/867,075

(22) Filed: Jun. 14, 2004

(65) Prior Publication Data

US 2005/0277565 A1 Dec. 15, 2005

(51) Int. Cl.
*C11D 7/50* (2006.01)
(52) U.S. Cl. .................. 510/411; 510/177; 510/273; 510/410; 134/38; 134/40; 252/67
(58) Field of Classification Search .............. None
See application file for complete search history.

(56) References Cited

U.S. PATENT DOCUMENTS

| | | | |
|---|---|---|---|
| 5,116,525 A | 5/1992 | Merchant et al. | |
| 5,182,040 A | 1/1993 | Bartlett et al. | 262/67 |
| 5,648,017 A | 7/1997 | Bartlett et al. | 252/67 |
| 5,683,974 A | 11/1997 | Lund et al. | |
| 6,100,229 A | 8/2000 | Swan et al. | |
| 6,790,820 B2* | 9/2004 | Bogdan et al. | 510/408 |
| 6,852,684 B1* | 2/2005 | Westbrook et al. | 510/410 |
| 2003/0050356 A1* | 3/2003 | Bogdan et al. | 521/131 |
| 2003/0141481 A1* | 7/2003 | Hitters et al. | 252/67 |
| 2003/0234380 A1 | 12/2003 | Knopeck et al. | |
| 2004/0167053 A1* | 8/2004 | Knopeck et al. | 510/405 |

FOREIGN PATENT DOCUMENTS

WO WO02/099006 12/2002

OTHER PUBLICATIONS

U.S. Appl. No. 10/389,503, filed Mar. 14, 2003, Gary M. Knopeck et al., Compositions of Pentafluoropropane.

* cited by examiner

*Primary Examiner*—Gregory Webb
(74) *Attorney, Agent, or Firm*—Erika S. Wilson

(57) ABSTRACT

Provided are azeotrope-like compositions comprising pentafluoropropane, methanol, and dichloroethylene, and uses thereof, including use in aerosols, refrigerant compositions, refrigeration systems, and blowing agent compositions.

18 Claims, 4 Drawing Sheets

1.0% MEOH/99.0% 245FA WITH TRANS1,2 DCE ADDITION

2% MeOH / 98% 245FA WITH TRANS 1,2 DCE ADDITIONS 3.5% MEOH/96.5%/245FA WITH TRANS 1,2 DCE ADDITIONS

AZEOTROPE-LIKE COMPOSITIONS OF PENTAFLUOROPROPANE, METHANOL AND DICHLOROETHYLENE

FIELD OF INVENTION

The present invention provides azeotrope-like compositions of pentafluoropropane, methanol, and dichloroethylene, and uses thereof.

BACKGROUND

Fluorocarbon based fluids have found widespread use in industry in a number of applications, including as refrigerants, aerosol solvents, propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential, such as hydrofluorocarbons ("HFCs"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and other fluorinated compounds, both of low ozone depletion potentials. Such mixtures are the subject of this invention.

DESCRIPTION OF PREFERRED EMBODIMENTS

Figure 1:
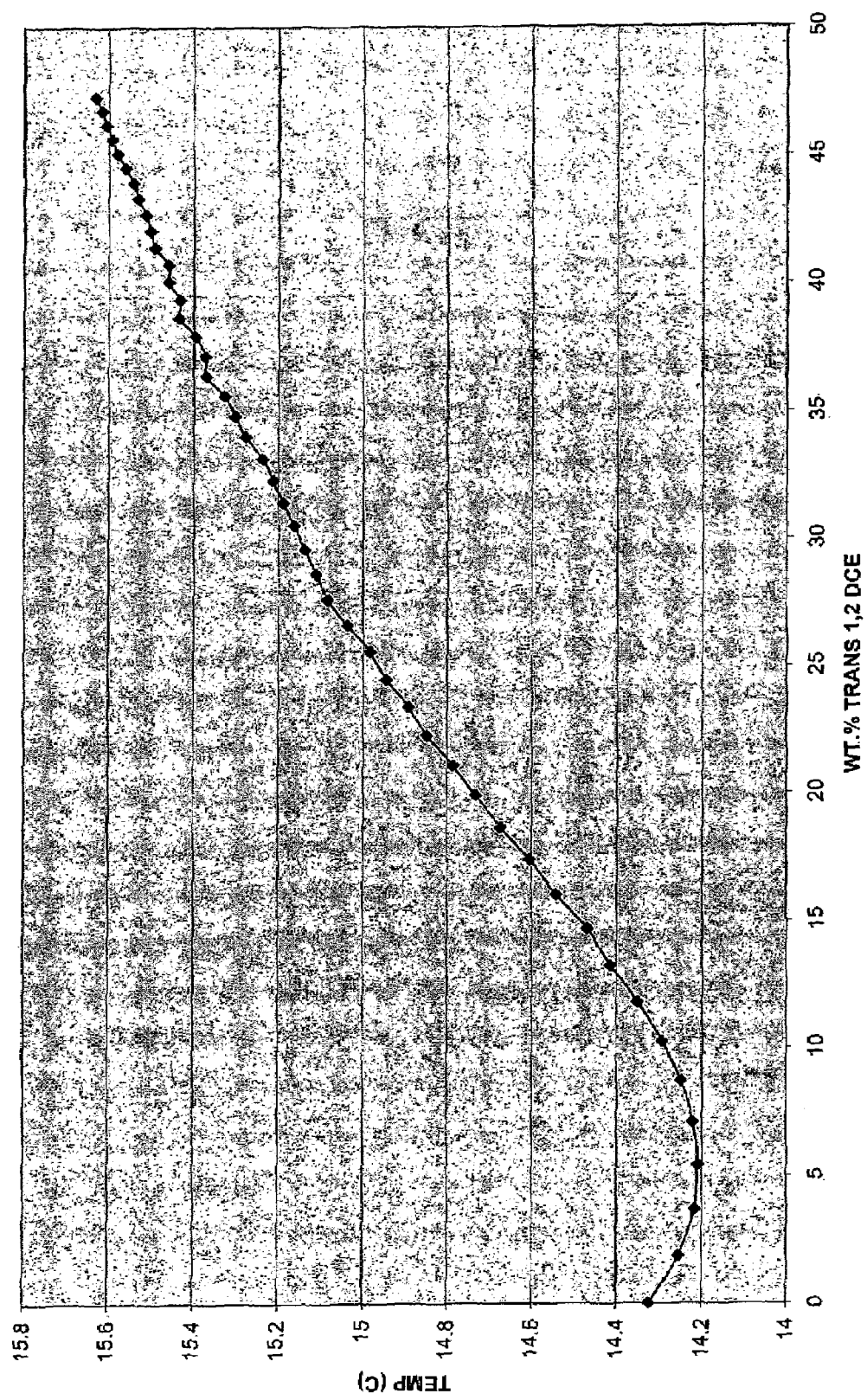
FIG. 1 is a graphical depiction of the boiling points associated with various compositions comprising 1,1,1,3,3-pentafluoropropane ("HFC-245fa"), methanol ("MeOH"), and trans-1,2-dichloroethylene ("Trans"), according to one embodiment of the present invention.

The present inventors have developed several compositions that help to satisfy the continuing need for alternatives to CFCs and HCFCs. According to certain embodiments, the present invention provides azeotrope-like compositions comprising 1,1,1,3,3-pentafluoropropane ("HFC-245fa"), methanol ("MeOH"), and trans-1,2-dichloroethylene ("Trans").

The preferred compositions of the invention provide environmentally desirable, zero ozone depletion potential replacements for currently used CFCs and HCFCs. Additionally, in certain embodiments the compositions of the invention exhibit characteristics that make the compositions better CFC and HCFC substitutes than any of HFC-245fa, MeOH, and Trans alone.

Additionally, applicants have recognized surprisingly that azeotrope-like compositions of HFC-245fa, MeOH, and Trans can be formed. Accordingly, in other embodiments, the present invention provides methods of producing an azeotrope-like composition comprising combining HFC-245fa, MeOH, and Trans in amounts effective to produce and azeotrope-like composition.

Applicants have further recognized that the azeotrope-like compositions of the present invention exhibits properties that make that make them advantageous for use as solvents and/or propellants in sprayable compositions, including aerosols. Accordingly, in yet other embodiments, the present invention provides solvents, propellants, and sprayable compositions comprising an azeotrope-like composition of HFC-245fa, MeOH, and Trans.

In yet other embodiments, the present invention provides refrigerants and blowing agents comprising an azeotrope-like composition of the present invention.

Azeotrope-like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes. (See, for example, U.S. Pat. No. 5,648,017 (column 3, lines 64-65) and U.S. Pat. No. 5,182,040 (column 3, lines 62-63), both of which are incorporated herein by reference). Applicants have discovered unexpectedly that HFC-245fa, MeOH, and Trans form azeotrope-like compositions.

According to certain preferred embodiments, the azeotrope-like compositions of the present invention comprise, and preferably consist essentially of, effective amounts of HFC-245fa, MeOH, and Trans. The term "effective amounts" as used herein refers to the amount of each component which upon combination with the other components, results in the formation of an azeotrope-like composition of the present invention. Preferably, the present azeotrope-like compositions comprise, and preferably consist essentially of, from about 50 to less than 100 weight percent of HFC-245fa, from greater than zero to about 25 weight percent of MeOH, and from greater than zero to about 30 weight percent of Trans. More preferably, the azeotrope-like compositions comprise, and preferably consist essentially of, from about 65 to less than 100 weight percent of HFC-245fa, from greater than zero to about 15 weight percent of MeOH, and from greater than zero to about 20 weight percent of Trans, and even more preferably from about 75 to less than 100 weight percent of HFC-245fa, from greater than zero to about 10 weight percent of MeOH, and from greater than zero to about 15 weight percent of Trans. Unless otherwise indicated, the weight percents disclosed herein are based on the total weight of HFC-245fa, MeOH, and Trans in a composition.

The azeotrope-like compositions described herein preferably have a boiling point of from about 14° C. to about 17° C. at a pressure of about 14 to 15 psia. In certain more preferred embodiments, the present azeotrope-like compositions have a boiling point of from about 14° C. to about 16° C. at a pressure of about 14 to 15 psia, and in even more preferred embodiments, from about 14° C. to about 15° C. at a pressure of about 14 to 15 psia.

The azeotrope-like compositions of the present invention can be produced by combining effective amounts of HFC-245fa, MeOH, and Trans. Any of a wide variety of methods known in the art for combining two or more components to form a composition can be adapted for use in the present methods to produce an azeotrope-like composition. For example, HFC-245fa, MeOH, and Trans can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Uses of the Compositions

The present compositions have utility in a wide range of applications. For example, one embodiment of the present invention relates to the use of the present compositions as solvents and/or propellants in sprayable compositions. In general, sprayable compositions comprise a material to be sprayed and a propellant, solvent or mixtures of two or more thereof. For a sprayable composition to be useful, it is necessary that the material to be sprayed be relatively or substantially soluble in the solvents to be used. While many HFCs alone, such as HFC-245fa, are poor solvents for many conventionally sprayable materials, applicants have recognized that the compositions of the present invention tend to exhibit relatively high solubility with such materials, while also tending to remain non-flammable.

Any of a wide range of sprayable materials can be used in conjunction with the compositions of the present invention to produce a sprayable composition according to the present invention. Examples of suitable materials include, without limitation, oils and other lubricants, release agents, cleaners, polishing agents, medicinal materials, such as, anti-asthma and anti-halitosis medicines, as well as, cosmetic materials, such as, deodorants, perfumes, hair sprays, and the like. The sprayable compositions of the present invention may further comprise any of a wide range of inert ingredients, additional solvents, and other materials used conventionally in sprayable compositions.

In certain other embodiments, the compositions of the present invention are used as, or in, refrigerant compositions. Refrigerant compositions of the present invention may be used in any of a wide variety of refrigeration systems including air-conditioning, refrigeration, heat-pump systems, and the like. In certain preferred embodiments, the compositions of the present invention are used in refrigeration systems originally designed for use with an HFC-refrigerant. The preferred compositions of the present invention tend to exhibit many of the desirable characteristics of other HFC-refrigerants, including non-flammability, and a GWP that is as low, or lower than that of conventional HFC-refrigerants. In addition, the relatively constant boiling nature of the compositions of the present invention makes them even more desirable than certain conventional CFCs, HCFCs, and/or HFCs for use as refrigerants in many applications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

Other uses of the present azeotrope-like compositions include use as non-aerosol solvents, cleaning agents, and the like. Those of skill in the art will be readily able to adapt the present compositions for use in such applications without undue experimentation.

EXAMPLES

The invention is further illustrated in the following examples that are intended to be illustrative, but not limiting in any manner.

Example 1

An ebulliometer comprising a vacuum jacketed tube with a condenser on top, which condenser is further equipped with a thermometer is used. About 5 grams of a mixture consisting of 99.5 wt. % HFC-245fa and 0.5 wt. % of MeOH is charged to the ebulliometer and then Trans is added in small, measured increments. The boiling point temperatures of the resulting ternary mixtures were recorded (see Table 1).

Temperature depression is observed when Trans is added to the HFC-245fa/MeOH mixture, indicating a ternary minimum boiling azeotrope is formed. From greater than about 0 to about 30 weight percent Trans, the boiling point of the composition changed by about 1° C. or less. The compositions exhibit azeotrope and/or azeotrope-like properties over this range. FIG. 1 is a graphical depiction of the data listed in Table 1.

TABLE 1

HFC-245fa/MeOH/Trans compositions at 14.42 psia

| Wt. % Trans (with remainder being HFC-245fa/MeOH mixture in 99.5:0.5 ratio) | Temperature (° C.) |
| --- | --- |
| 0.00000 | 14.324733 |
| 1.874525 | 14.255234 |
| 3.680066 | 14.218267 |
| 5.420362 | 14.20977 |
| 7.098887 | 14.220521 |
| 8.718874 | 14.249896 |
| 10.28333 | 14.294988 |
| 11.79506 | 14.350909 |
| 13.2567 | 14.414025 |
| 14.67068 | 14.469872 |
| 16.0393 | 14.542105 |
| 17.36471 | 14.605315 |
| 18.64893 | 14.67205 |
| 19.89384 | 14.731918 |
| 21.10123 | 14.786563 |
| 22.27275 | 14.8467 |
| 23.41 | 14.891907 |
| 24.51445 | 14.944701 |
| 25.5875 | 14.983561 |
| 26.63047 | 15.03836 |
| 27.6446 | 15.084299 |
| 28.63108 | 15.111737 |
| 29.59103 | 15.138144 |
| 30.52549 | 15.164986 |
| 31.43548 | 15.188504 |
| 32.32193 | 15.21308 |
| 33.18576 | 15.237798 |
| 34.02781 | 15.275908 |
| 34.84891 | 15.303219 |
| 35.64981 | 15.326635 |
| 36.43126 | 15.36948 |
| 37.19396 | 15.372878 |
| 37.93858 | 15.395723 |
| 38.66575 | 15.433039 |
| 39.37607 | 15.43316 |
| 40.07013 | 15.459317 |
| 40.74848 | 15.45859 |
| 41.41164 | 15.491919 |
| 42.06012 | 15.501624 |
| 42.69441 | 15.511375 |
| 43.31496 | 15.530083 |
| 43.92221 | 15.542162 |
| 44.51659 | 15.560614 |
| 45.0985 | 15.579288 |
| 45.66833 | 15.591573 |
| 46.22645 | 15.606808 |
| 46.77323 | 15.616341 |
| 47.309 | 15.630337 |

Example 2

Figure 2:
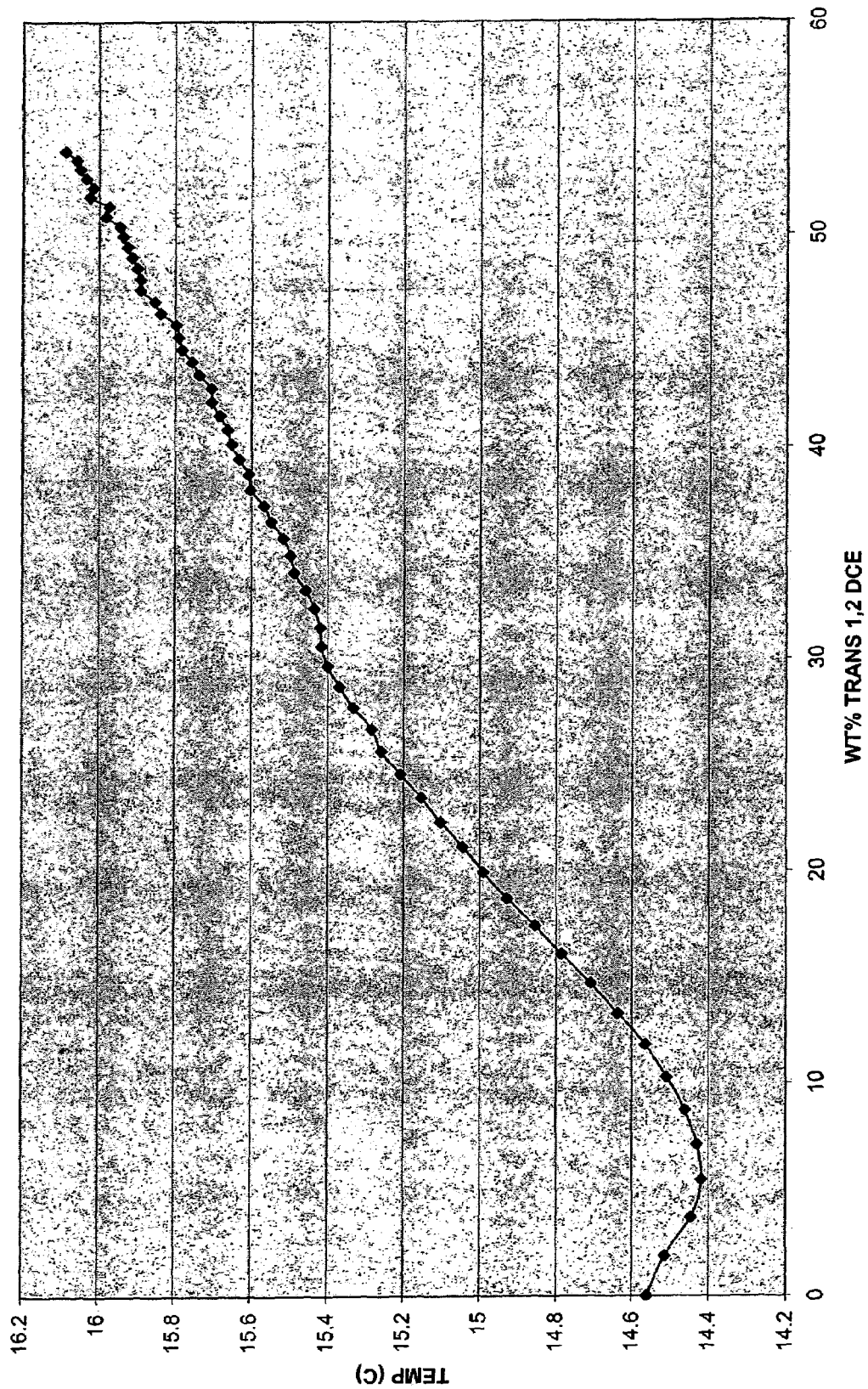
FIG. 2 is a graphical depiction of the boiling points associated with various other compositions comprising HFC-245fa, MeOH, and Trans, according to another embodiment of the present invention.

An ebulliometer comprising a vacuum jacketed tube with a condenser on top, which condenser is further equipped with a thermometer is used. About 5 grams of a mixture consisting of 99 wt. % HFC-245fa and 1 wt. % of MeOH is charged to the ebulliometer and then Trans is added in small, measured increments. The boiling point temperatures of the resulting ternary mixtures were recorded (see Table 2). Temperature depression is observed when Trans is added to the HFC-245fa/MeOH mixture, indicating a ternary minimum boiling azeotrope is formed. From greater than about 0 to about 30 weight percent Trans, the boiling point of the composition changed by about 1° C. or less. The compositions exhibit azeotrope and/or azeotrope-like properties over this range. FIG. 2 is a graphical depiction of the data listed in Table 2.

TABLE 2

HFC-245fa/MeOH/Trans compositions at 14.55 psia

| Wt. % Trans (with remainder being HFC-245fa/MeOH mixture in 99:1 ratio) | Temperature (° C.) |
| --- | --- |
| 0.00000 | 14.560875 |
| 1.881539 | 14.51505 |
| 3.693583 | 14.446242 |
| 5.43991 | 14.418792 |
| 7.124033 | 14.430813 |
| 8.749217 | 14.461814 |
| 10.3185 | 14.509962 |
| 11.83473 | 14.56614 |
| 13.30053 | 14.636285 |
| 14.7184 | 14.709037 |
| 16.09063 | 14.784681 |
| 17.4194 | 14.85534 |
| 18.70675 | 14.92799 |
| 19.95457 | 14.991131 |
| 21.16467 | 15.044294 |
| 22.33872 | 15.101542 |
| 23.47832 | 15.153657 |
| 24.58496 | 15.208391 |
| 25.66004 | 15.260273 |
| 26.70491 | 15.284395 |
| 27.72081 | 15.332457 |
| 28.70893 | 15.370247 |
| 29.6704 | 15.40032 |
| 30.60628 | 15.416988 |
| 31.51758 | 15.42089 |
| 32.40526 | 15.435677 |
| 33.27022 | 15.45826 |
| 34.11332 | 15.488271 |
| 34.93538 | 15.496955 |
| 35.73718 | 15.516719 |
| 36.51947 | 15.549104 |
| 37.28293 | 15.566483 |
| 38.02825 | 15.603293 |
| 38.75606 | 15.606917 |
| 39.46698 | 15.633639 |
| 40.16158 | 15.651954 |
| 40.84042 | 15.662793 |
| 41.50403 | 15.682942 |
| 42.15292 | 15.704715 |
| 42.78757 | 15.704413 |
| 43.40844 | 15.736451 |
| 44.01599 | 15.754755 |
| 44.61063 | 15.781732 |
| 45.19277 | 15.79035 |
| 45.7628 | 15.796134 |
| 46.32109 | 15.837646 |
| 46.86801 | 15.853533 |
| 47.4039 | 15.891707 |
| 47.92908 | 15.890446 |
| 48.44388 | 15.89914 |
| 48.9486 | 15.912785 |
| 49.44353 | 15.924059 |
| 49.92896 | 15.937334 |
| 50.40516 | 15.945772 |
| 50.87238 | 15.982232 |
| 51.33088 | 15.974255 |
| 51.78091 | 16.024206 |
| 52.22268 | 16.015691 |
| 52.65644 | 16.034227 |
| 53.08239 | 16.051006 |
| 53.50075 | 16.058578 |
| 53.91171 | 16.088404 |

Example 3

Figure 3:
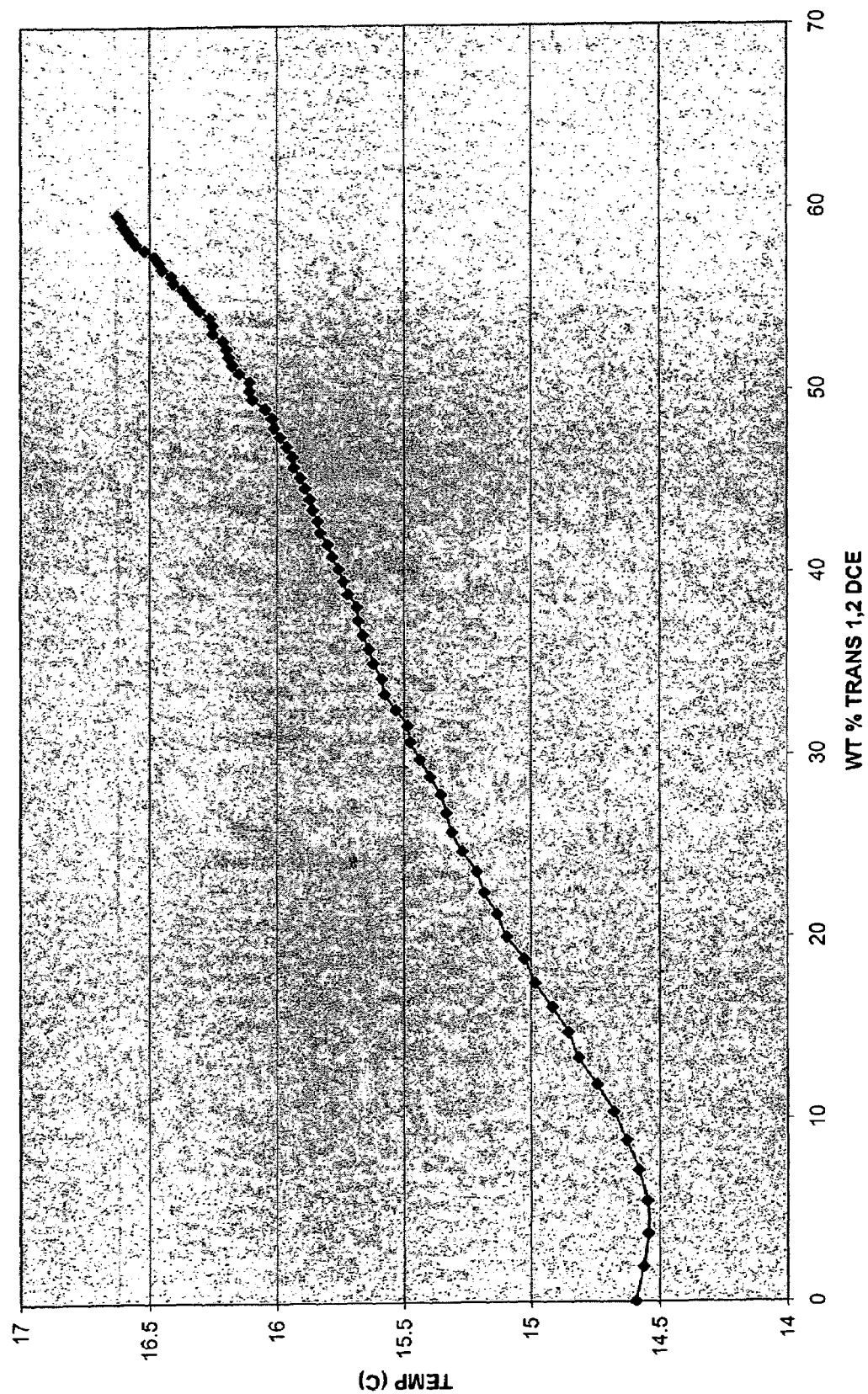
FIG. 3 is a graphical depiction of the boiling points associated with various other compositions comprising HFC-245fa, MeOH, and Trans, according to yet another embodiment of the present invention.

An ebulliometer comprising a vacuum jacketed tube with a condenser on top, which condenser is further equipped with a thermometer is used. About 5 grams of a mixture consisting of 98 wt. % HFC-245fa and 2 wt. % of MeOH is charged to the ebulliometer and then Trans is added in small, measured increments. The boiling point temperatures of the resulting ternary mixtures were recorded (see Table 3). Temperature depression is observed when Trans is added to the HFC-245fa/MeOH mixture, indicating a ternary minimum boiling azeotrope is formed. From greater than about 0 to about 30 weight percent Trans, the boiling point of the composition changed by about 1° C. or less. The compositions exhibit azeotrope and/or azeotrope-like properties over this range. FIG. 3 is a graphical depiction of the data listed in Table 3.

TABLE 3

HFC-245fa/MeOH/Trans compositions at 14.56 psia

| Wt. % Trans (with remainder being HFC-245fa/MeOH mixture in 98:2 ratio) | Temperature (° C.) |
|---|---|
| 0.00000 | 14.591277 |
| 1.892873 | 14.563341 |
| 3.715417 | 14.54399 |
| 5.471782 | 14.548524 |
| 7.164638 | 14.581501 |
| 8.798208 | 14.628102 |
| 10.37528 | 14.678294 |
| 11.89874 | 14.742496 |
| 13.37127 | 14.813788 |
| 14.79539 | 14.854977 |
| 16.17344 | 14.916289 |
| 17.50763 | 14.984128 |
| 18.80001 | 15.026536 |
| 20.05252 | 15.096852 |
| 21.26698 | 15.136507 |
| 22.44509 | 15.184695 |
| 23.58847 | 15.216237 |
| 24.69862 | 15.272987 |
| 25.77698 | 15.312193 |
| 26.82489 | 15.335533 |
| 27.84362 | 15.356987 |
| 28.83437 | 15.398328 |
| 29.79829 | 15.438179 |
| 30.73644 | 15.476011 |
| 31.64985 | 15.487076 |
| 32.53948 | 15.532612 |
| 33.40625 | 15.57818 |
| 34.25103 | 15.589618 |
| 35.07464 | 15.620276 |
| 35.87788 | 15.639918 |
| 36.66148 | 15.663562 |
| 37.42617 | 15.682445 |
| 38.1726 | 15.684817 |
| 38.90145 | 15.720893 |
| 39.6133 | 15.740252 |
| 40.30876 | 15.759583 |
| 40.98839 | 15.784468 |
| 41.65271 | 15.80168 |
| 42.30224 | 15.831784 |
| 42.93747 | 15.841793 |
| 43.55887 | 15.862217 |
| 44.16687 | 15.870884 |
| 44.76192 | 15.889942 |
| 45.34442 | 15.909451 |
| 45.91476 | 15.934654 |
| 46.47332 | 15.940821 |
| 47.02046 | 15.961336 |
| 47.55653 | 15.98724 |
| 48.08186 | 16.011146 |
| 48.59677 | 16.019877 |

TABLE 3-continued

HFC-245fa/MeOH/Trans compositions at 14.56 psia

| Wt. % Trans (with remainder being HFC-245fa/MeOH mixture in 98:2 ratio) | Temperature (° C.) |
|---|---|
| 49.10156 | 16.047012 |
| 49.59654 | 16.096498 |
| 50.08198 | 16.107891 |
| 50.55817 | 16.1061 |
| 51.02535 | 16.148877 |
| 51.48378 | 16.175016 |
| 51.93372 | 16.191049 |
| 52.37538 | 16.199324 |
| 52.80901 | 16.213993 |
| 53.2348 | 16.2523 |
| 53.65298 | 16.253063 |
| 54.06375 | 16.265377 |
| 54.46731 | 16.304252 |
| 54.86383 | 16.329281 |
| 55.25351 | 16.349336 |
| 55.63651 | 16.372544 |
| 56.01302 | 16.408122 |
| 56.38319 | 16.415054 |
| 56.74718 | 16.450079 |
| 57.10514 | 16.462111 |
| 57.45723 | 16.482437 |
| 57.80358 | 16.518946 |
| 58.14435 | 16.55335 |
| 58.47965 | 16.573452 |
| 58.80962 | 16.585997 |
| 59.13439 | 16.603632 |
| 59.45408 | 16.608104 |
| 59.7688 | 16.625504 |

Example 4

Figure 4:
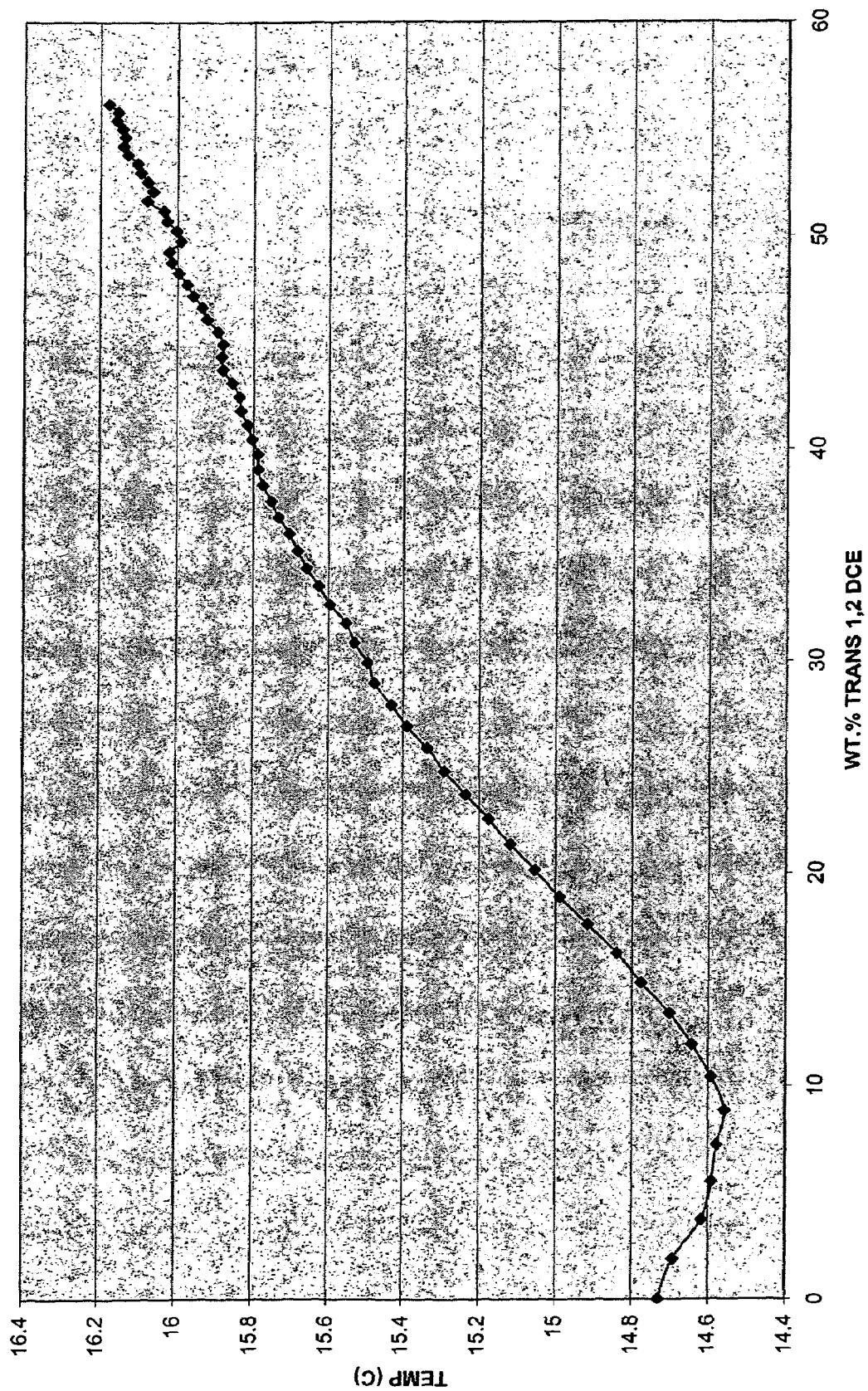
FIG. 4 is a graphical depiction of the boiling points associated with various other compositions comprising HFC-245fa, MeOH, and Trans, according to yet another embodiment of the present invention.

An ebulliometer comprising a vacuum jacketed tube with a condenser on top, which condenser is further equipped with a thermometer is used. About 5 grams of a mixture consisting of 96.5 wt. % HFC-245fa and 3.5 wt. % of MeOH is charged to the ebulliometer and then Trans is added in small, measured increments. The boiling point temperatures of the resulting ternary mixtures were recorded (see Table 4). Temperature depression is observed when Trans is added to the HFC-245fa/MeOH mixture, indicating a ternary minimum boiling azeotrope is formed. From greater than about 0 to about 30 weight percent Trans, the boiling point of the composition changed by about 1° C. or less. The compositions exhibit azeotrope and/or azeotrope-like properties over this range. FIG. 4 is a graphical depiction of the data listed in Table 4.

TABLE 4

HFC-245fa/MeOH/Trans compositions at 14.65 psia

| Wt. % Trans (with remainder being HFC-245fa/MeOH mixture in 96.5:3.5 ratio) | Temperature (° C.) |
|---|---|
| 0.00000 | 14.731811 |
| 1.904343 | 14.69272 |
| 3.737512 | 14.616791 |
| 5.503422 | 14.591727 |
| 7.20571 | 14.578382 |
| 8.847751 | 14.557459 |
| 10.43269 | 14.593235 |
| 11.96345 | 14.643081 |
| 13.44277 | 14.702296 |

TABLE 4-continued

HFC-245fa/MeOH/Trans compositions at 14.65 psia

| Wt. % Trans (with remainder being HFC-245fa/MeOH mixture in 96.5:3.5 ratio) | Temperature (° C.) |
|---|---|
| 14.8732 | 14.776435 |
| 16.25711 | 14.839809 |
| 17.59675 | 14.917078 |
| 18.89421 | 14.990399 |
| 20.15144 | 15.054305 |
| 21.37028 | 15.119122 |
| 22.55428 | 15.175226 |
| 23.69965 | 15.236056 |
| 24.81334 | 15.291126 |
| 25.89498 | 15.336807 |
| 26.94595 | 15.390322 |
| 27.96752 | 15.430787 |
| 28.96091 | 15.477335 |
| 29.92728 | 15.495534 |
| 30.8677 | 15.530907 |
| 31.78322 | 15.554562 |
| 32.67481 | 15.595807 |
| 33.54339 | 15.626446 |
| 34.38985 | 15.659309 |
| 35.21502 | 15.682632 |
| 36.01968 | 15.704625 |
| 36.80461 | 15.732975 |
| 37.5705 | 15.752819 |
| 38.31806 | 15.775374 |
| 39.04792 | 15.788448 |
| 39.76072 | 15.789786 |
| 40.45703 | 15.804674 |
| 41.13743 | 15.815627 |
| 41.80246 | 15.833471 |
| 42.45263 | 15.83819 |
| 43.08843 | 15.857033 |
| 43.71034 | 15.880328 |
| 44.3188 | 15.883979 |
| 44.91425 | 15.88083 |
| 45.49709 | 15.895206 |
| 46.06773 | 15.921987 |
| 46.62655 | 15.935088 |
| 47.17391 | 15.958388 |
| 47.71015 | 15.9749 |
| 48.23561 | 15.996772 |
| 48.75062 | 16.015236 |
| 49.25549 | 16.021737 |
| 49.7505 | 15.990765 |
| 50.23595 | 16.003396 |
| 50.71211 | 16.027484 |
| 51.17924 | 16.035907 |
| 51.6376 | 16.078185 |
| 52.08743 | 16.0628 |
| 52.52898 | 16.077378 |
| 52.96246 | 16.094515 |
| 53.38809 | 16.103289 |
| 53.80609 | 16.129645 |
| 54.21666 | 16.139903 |
| 54.62 | 16.135387 |
| 55.01629 | 16.142765 |
| 55.40572 | 16.158141 |
| 55.78847 | 16.153889 |
| 56.1647 | 16.179065 |
| — | — |

What is claimed is:

1. A ternary azeotrope-like composition consisting of effective amounts of HFC-245fa, MeOH, and trans-1,2-dichloroethylene.

2. The azeotrope-like composition of claim 1 which consists of from about 50 to less than 100 weight percent of HFC-245fa, from greater than zero to about 25 weight percent of MeOH, and from greater than zero to about 30 weight percent of trans-1,2-dichloroethylene.

3. The azeotrope-like composition of claim 1 which consists of from about 65 to less than 100 weight percent of HFC-245fa, from greater than zero to about 15 weight percent of MeOH, and from greater than zero to about 20 weight percent of trans-1,2-dichloroethylene.

4. The azeotrope-like composition of claim 1 which consists of preferably from about 75 to less than 100 weight percent of HFC-245fa, from greater that zero to about 10 weight percent of MeOH, and from greater than zero to about 15 weight percent of trans-1,2-dichloroethylene.

5. The azeotrope-like composition of claim 1 having a boiling point of from about 14° C. to about 17° C. at a pressure of from about 14 to about 15 psia.

6. The azeotrope-like composition of claim 1 having a boiling point of from about 14° C. to about 16° C. at a pressure of from about 14 to about 15 psia.

7. The azeotrope-like composition of claim 1 having a boiling point of from about 14° C. to about 15° C. at a pressure of from about 14 to about 15 psia.

8. The azeotrope-like composition of claim 2 having a boiling point of from about 14° C. to about 15° C. at a pressure of from about 14 to about 15 psia.

9. A method of producing a ternary azeotrope-like composition consisting of combining effective amounts of HFC-245fa, MeOH, and trans-1,2-dichloroethylene.

10. The method of claim 9 consisting of combining from about 50 to less than 100 weight percent of HFC-245fa, from greater than zero to about 25 weight percent of MeOH, and from greater than zero to about 30 weight percent of trans-1,2-dichloroethylene to form an azeotrope-like composition.

11. A sprayable composition comprising a material to be sprayed and a solvent comprising an azeotrope-like composition of claim 1.

12. The sprayable composition according to claim 11 wherein the sprayable composition is an aerosol.

13. The sprayable composition according to claim 12 wherein the sprayable composition is selected from the group consisting of oils, release agents, cleaners, polishing agents, medicinal materials, cosmetic materials, and combinations of two or more thereof.

14. A refrigerant composition comprising an azeotrope-like composition of claim 1.

15. A refrigeration system comprising a refrigerant of claim 14.

16. A method for cooling an article which comprises condensing a refrigerant composition of claim 14 and thereafter evaporating said refrigerant composition in the vicinity of the article to be cooled.

17. A method for heating an article which comprises condensing a refrigerant composition of claim 14 in the vicinity of the article to be heated and thereafter evaporating said refrigerant composition.

18. A blowing agent comprising an azeotrope-like composition of claim 1.

* * * * *